United States Patent [19]

Kaye

[11] Patent Number: 5,694,393

[45] Date of Patent: Dec. 2, 1997

[54] COMMUNICATIONS SYSTEM

[75] Inventor: Stefan F. Kaye, Cambridge, England

[73] Assignee: U.S. Philips Corporation, New York, N.Y.

[21] Appl. No.: 337,594

[22] Filed: Nov. 10, 1994

[30] Foreign Application Priority Data

Nov. 11, 1993 [GB] United Kingdom ............ 9323329

[51] Int. Cl.⁶ ................................................ H04J 3/24
[52] U.S. Cl. ........................................ 370/408; 455/33.1
[58] Field of Search ..................... 370/60, 60.1, 94.1, 370/94.2, 94.3, 61, 95.1, 95.2, 95.3, 85.7, 241, 244, 247, 248, 250, 251, 252, 254, 256, 310, 311, 312, 321, 329, 346, 347, 406, 407, 408, 427, 425, 471; 379/59, 60, 58, 93–95; 455/33.1, 33.2, 33.3, 54.1, 54.2, 67.1

[56] References Cited

U.S. PATENT DOCUMENTS 5,353,283 10/1994 Tsuchiya .............................. 370/94.3

FOREIGN PATENT DOCUMENTS 0260763 3/1988 European Pat. Off. .
3827698 12/1989 Germany .
9313631 7/1993 WIPO .

OTHER PUBLICATIONS

Search Report.

M.S. Appleby et al, "The Cellnet Cellular Radio Network, Britich Telecommunications Engineering", vol. 4, Jul. 1985, pp. 62–69.

Primary Examiner—Douglas W. Olms
Assistant Examiner—Dang Ton
Attorney, Agent, or Firm—Arthur G. Schaier

[57] ABSTRACT

A communications system includes a network formed by several geographically distributed, interconnected nodes, each of which defines a service area. Each node has stores registration details for at least one of several of subscriber units, the node being the home node for such at least one station. Each node is responsive to a subscriber unit registering with a node other than its home node for causing registration details relating to that subscriber unit to be stored at those of the interconnected nodes lying on a path between the home node and the node at which registration has most recently occurred.

20 Claims, 11 Drawing Sheets

COMMUNICATIONS SYSTEM

TECHNICAL FIELD

The present invention relates to a communications system and particularly but not exclusively to call processing and mobility management in a communications system.

BACKGROUND OF THE INVENTION

In a communications system comprising a number of geographically distributed nodes defining a plurality of service areas, a subscriber unit, for example mobile station may roam from service area to service area. Unless there is a system for registration, that is a mobile station informing a node that it is in its service area, any calls to the mobile station have to be broadcast by all the nodes throughout the network to be sure that the mobile station receives the call, assuming that it is in range. Registration per se is not new, it is a feature of cellular telephone systems, for example see British Telecommunications Engineering, Vol. 4, 1985 pages 62 to 69, particularly page 67 right hand column, as well as of private mobile radio (PMR) trunking systems, see for example European Patent Specification 0 260 763 A2.

In a hierarchical trunked PMR system such as MPT 1327 "A Signalling Standard for Trunked Private Land Mobile Radio Systems" published by The Radiocommunications Agency, an Executive Agency of the Department of Trade and Industry, London, England, a plurality of geographically distributed base stations define a plurality of service areas which may be contiguous or overlap depending on the topographical features which may affect signal propagation. Base stations in the most elementary form comprise one or more transceivers. Control of the base stations is carried out by trunking system controllers (TSCs) which in practice are large computers. Each TSC is coupled by landlines to its associated base stations and the TSCs are interconnected by landlines such as the PSTN.

Normally information about a mobile station is stored by one TSC which may be regarded as its home TSC. If a mobile station should roam outside the service areas of the base stations connected to the home TSC then whenever it registers, frequently at the time it wants to make a call, the TSC covering the local service area in which the mobile station is presently located has to contact the home TSC to obtain registration information about the mobile station. This process causes a time delay in setting up a call because information has to be passed back and forth.

WO93/13631 discloses a hierarchical universal communications system comprising a plurality of organisational layers. Each layer comprises a plurality of nodes. The plurality of nodes includes a plurality of base stations in the first layer, and a plurality of communication services nodes organised into higher layers. Each communication services node includes a database possibly containing information on the locations of one or more portable communication units. The databases constitute a distributed database containing information on the locations of some of the portable communication units within the system, and a tracing strategy is realised by the transmission of control messages informing the system of a moving portable communication unit's location. The system tries to set up a connection to the home address of the called portable communication unit. If there is information on the called unit, its location is indicated by the address chain in the distributed database.

SUMMARY OF THE INVENTION

An object of the present invention is to facilitate call processing and mobility management in a communications system, particularly but not exclusively, a non-hierarchical system which user.

According to the present invention there is provided a communications system comprising a network formed by a plurality of geographically distributed interconnected nodes, each defining a service area, means interconnecting the nodes, a plurality of subscriber units, means for storing registration details of a subscriber unit at one of said nodes, defined as a home node, means responsive to a subscriber unit registering with a node other than its home node for causing registration details relating that subscriber unit to be stored at those of said interconnected nodes lying on a path between said home node and the node at which registration has most recently occurred.

In the present specification a node is defined as a switching center at which registration by a subscriber unit is possible and a subscriber unit may comprise a unit communicating by radio and/or by landline.

By means of the present invention registration details relating to a subscriber unit are carried by all the node controllers between the home node and the node of the service area in which the subscriber unit is currently located. Thus when the subscriber unit wishes to make a call, the local node controller can quickly set-up the call because it already has the registration details of the subscriber unit. If the subscriber unit enters an adjoining service area and registers with its node, the mobility management at this new node only has to contact the node of the adjacent service area to obtain the subscriber unit's registration particulars. Equally if as a result of the subscriber unit registering with another node, one or other nodes in the network currently carrying the registration details now lie outside the path of the nodes required to carry registration details relating to that subscriber unit, then it (or they) deregister the subscriber unit.

The system in accordance with the present invention is able to accept group registrations. Such registrations require a group home node which may be different from an individual subscriber unit's home node. Thus when at least 2 subscriber units form a group with its own group registration identity, each node comprises means responsive to a subscriber unit belonging to a group registering with it for checking if the group is already registered with that node, and if it is not so registered, the node enters the group registration details.

Likewise the last subscriber unit of a group deregistering from a node will cause deregistering of the group.

The communications system may have other facilities such as monitoring of individual subscriber units or those of a group.

A node for use in the communication system in accordance with the present invention comprises transmitting means, receiving means and a switching center, said switching center including a routing manager for controlling interfaces with other nodes in the system and for handling call processing and mobility management and a terminal interface manager for translating call processing and mobility management signalling between the routing manager and at one subscriber terminal equipment.

BRIEF DESCRIPTION OF THE DRAWING

The present invention will now be described, by way of example, with reference to the accompanying drawings, wherein.

In the drawings the same reference numerals have been used to indicate corresponding features.

DETAILED DESCRIPTION

Figure 1:
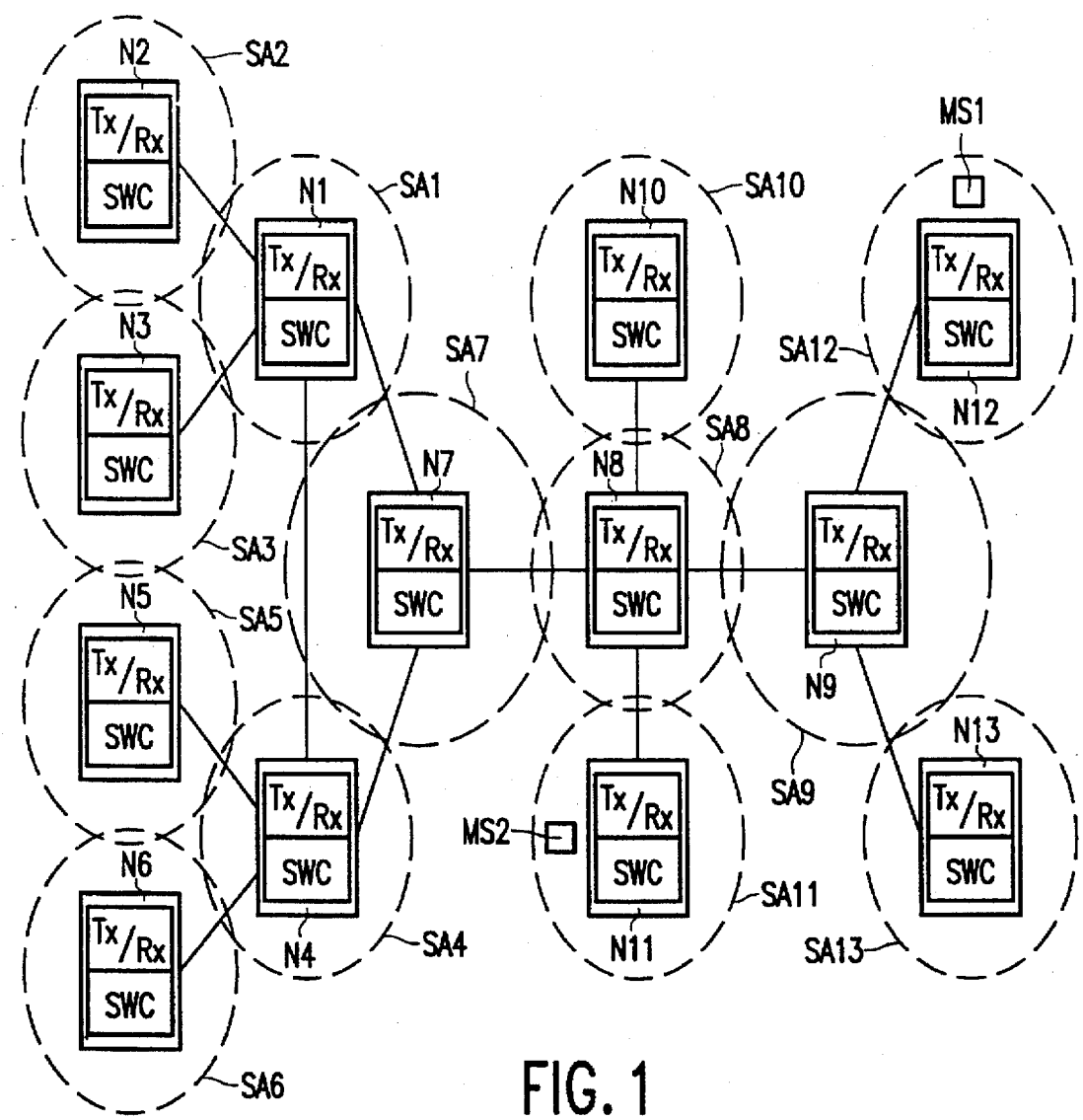
FIG. 1 is a diagram of the distribution of nodes in a non-hierarchical communications network.

In FIG. 1, the network comprises a plurality of geographically spread nodes N1 to N13. The nodes are interconnected by suitable high capacity two-way links, for example landline links or microwave links according to a predetermined pattern in which N1 is connected to N2, N3, N4 and N7, N4 is additionally connected to N5, N6 and N7, N7 is additionally connected to N8 which also has connections to N9, N10 and N11 and in which N9 is also connected to N12, N13. Thus connections from certain nodes to certain other nodes has to be by way of intermediate nodes, for example N10 can only communicate with N12 by way of intermediate nodes N8, N9.

Each node includes a switching center SWC which is able to register subscriber units, for example mobile stations MS1, MS2. In the illustrated embodiment each node includes at least one transceiver for communicating with a subscriber unit when in its service area SA1 to SA13. The subscriber units may be able to communicate by radio and/or by way of landlines.

Figure 2:
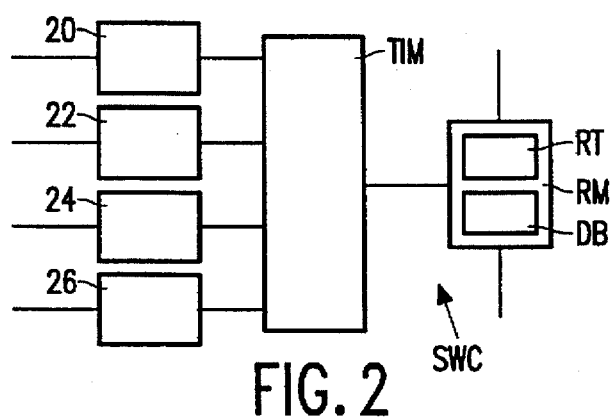
FIG. 2 is a block diagram of the architecture of a switching centre.

Referring to FIG. 2 the switching center SWC at each node comprises two main elements a routing manager RM and a terminal interface manager TIM. The routing manager RM controls the interfaces with other nodes and handles call processing and mobility management in a manner which is not dependent on the interface. The terminal interface manager TIM translates call processing and mobility management signalling between the routing manager RM and various interfaces with subscriber terminal equipment. The actual hardware installed at each node is dictated by the anticipated traffic density and processing power required at the node both of which are dependent on the position of the node in the network configuration. For example, a node, such as N8, which forms the hub of a star network will clearly carry more traffic and require greater processing power than a node, such as N2, at the periphery. As a consequence, software implementing the node call processing functions is portable between different hardware platforms. Each node in the network is uniquely addressable.

In order for the routing manager RM to be able to handle all call processing and mobility management functions at a node it holds the following data:

A routing table RT which contains indications to which neighbouring node a message must be sent in order to reach any other node in the network. This is a logical routing which will normally match the physical routing in order to fulfil the objective of obtaining the fastest possible call set-up times. However this may be varied under fault conditions. As physical routing is not essential to the understanding of the present invention it will not be described in greater detail.

A database DB which contains a subset of the total of subscriber or mobile station records (both individuals and groups). Some of these records refer to subscribers actually registered on the system via the current node. Others of these records refer to subscribers registered on other nodes and serve as pointers for locating those subscribers.

The terminal interface manager TIM is a collective name given to a set of managers, one for each interface over which subscribers (or mobile stations) may register and communicate with the system infrastructure. The TIM functions as a translator between the protocol appropriate to the interface it is managing and the common protocol between all the interface managers and the routing manager RM.

In the illustrated embodiment of the switching center SWC, there are four interfaces. A trunked air interface handler 20 which serves for communication with mobile stations via an analogue, trunked private mobile radio, for example MPT 1327, interface or a digital interface. A line subscriber interface handler 22 supports the same services as those provided by the handler 20. The interface handler 22 may need to support additional services required by line-connected despatchers, such as the ability to list active members of a talk group. A non-trunked system interface handler 24 for handling interfaces to PSTN, PABX and PDN (Public Data Network) which in fact may require separate interface managers. Finally an inter-system interface handler 26 which will enable subscribers to migrate from one system to another. This interface handler 26 supports both call services and mobility management in a modified form.

Mobility management is achieved primarily by registration and deregistration which will generally be carried out using the air interface handler 20 but other ones of the interface handlers may be involved. When a subscriber registers, it creates or updates a subscriber record in the system database which indicates both the node and the interface by which the subscriber is currently attached to the system.

It should be noted that a "Subscriber Identity" in the present specification may refer either to a piece of equipment, or to an individual user who is "logged on" to a piece of equipment. Hence mobility management is applicable even at interfaces where the connection to the subscriber equipment is fixed. A database of subscriber information is distributed around the system. Each subscriber record is mastered at a respective one of the nodes in the network and for that particular subscriber it is its home node. To allow the maximum flexibility of configuration, it is necessary for different subscriber records to have different home nodes. Each subscriber's identity includes an indication of the node at which the subscriber's address is mastered.

Figure 3:
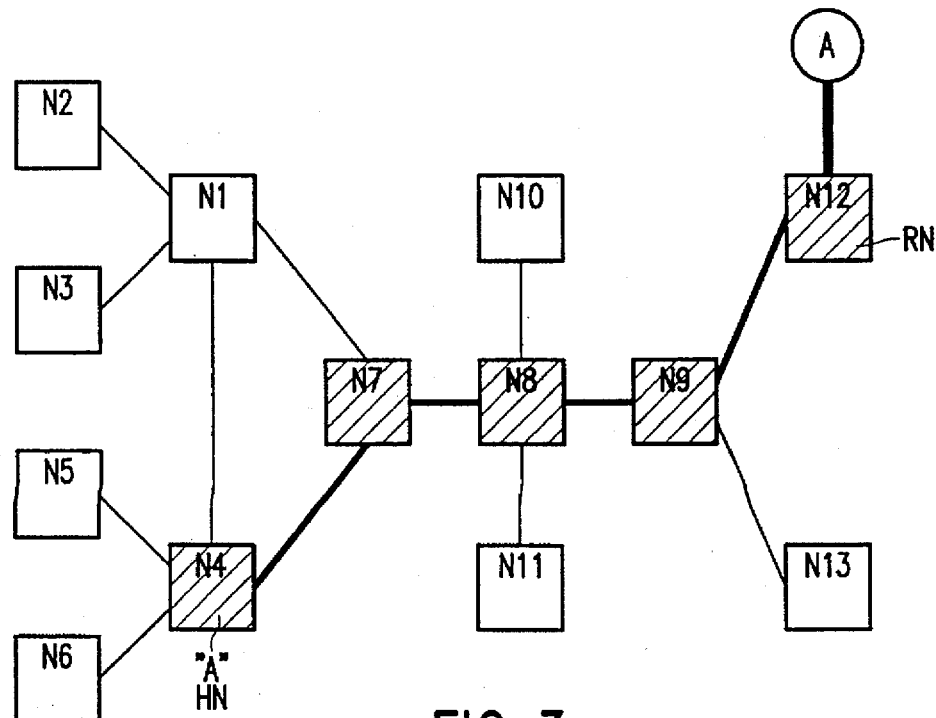
FIG. 3 illustrates the registration of a subscriber unit's particulars at a series of nodes along a path, termed herein "a snail trail"

Once a subscriber's home node has been identified, the rest of the system may be regarded as a star network from that subscriber's point of view. Referring to FIG. 3, assuming that the node N4 is subscriber (or mobile station) A's home node (HN), then it will be a single logical path from the other nodes to the node N4. In the case of a meshed network, one or more physical paths may be available to provide resilience but in general only currently active paths will be considered.

In FIG. 3 assuming the subscriber A has moved into the service area of the node N12 and requests registration, the routing manager at the node N12, termed the registration node (RN), determines the address of the home node (node N4) for that subscriber. In this instance, as the registration node is not the home node, it forwards a request for the subscriber's details to the home node using its routing table to determine the neighbouring node, in this instance the node N9, to which the request must be passed. Each node on the path passes the request on in the same way, that is N9 to N8, N8 to N7 and N7 to N4. For convenience these nodes have been shown cross-hatched.

When the request reaches the home node (node N4) it is checked to ensure that it is valid and if so, a copy of the subscriber's details is forwarded back along the path to the registration node. At each of the intervening nodes, that is N7, N8 and N9, a copy of the record is retained which will facilitate fast call set-up. The trail between the home node and the registration has been emboldened and is termed the "snail trail".

At each node on the snail trail, the subscriber's record indicates the current registration node. If the subscriber A moves from the service area of the node N12 to that of the node N10, this latter node becomes the registration node and in so doing passes a request for subscriber A's record to the node N8. Since node N8 already has the subscriber's details it can reply immediately to the request. Following registration of subscriber A on the node 10, the routing manager of the node N8 instructs the nodes N9 and N12 to de-register and at the same time informs the routing managers of the nodes N7 and N4 that subscriber A is now registered on the node N10.

Figure 4:
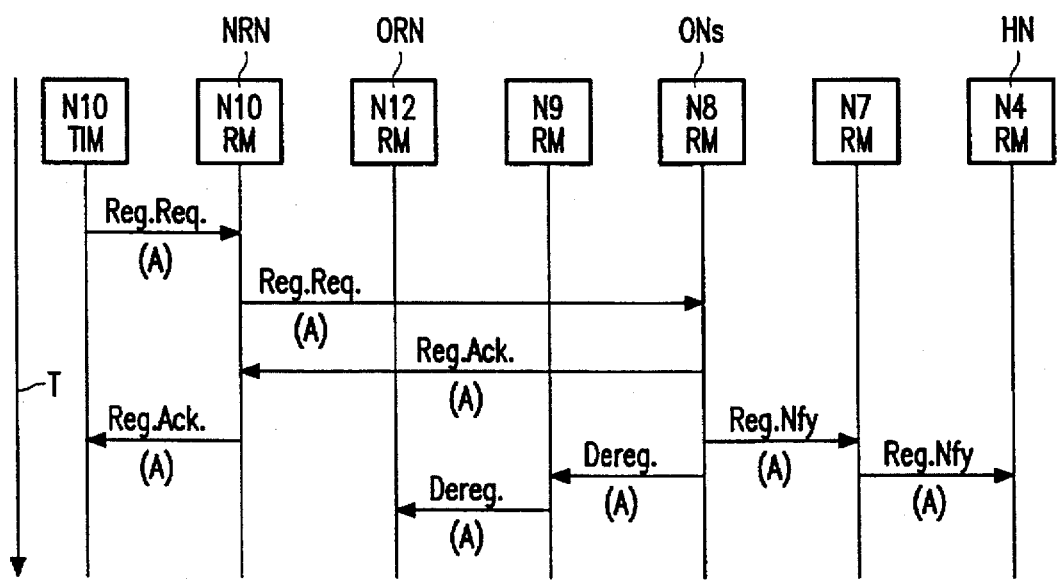
FIG. 4 shows the registration message sequence.

FIG. 4 illustrates the registration message sequence involved in this change of registration. In FIG. 4 the terminal interface and routing managers of the respective nodes are indicated in the squares and time T progresses downwards. The following abbreviations have been used:

Reg. Req.—registration request
Reg. Ack.—registration acknowledged
Dereg.—deregister
Reg. Nfy—notify registration
HN—Home node
ONs—Other nodes
ORN—Old Registration node
NRN—New Registration node The sequence should be self evident from the foregoing explanation.

The described registration procedure can be adapted to group membership and coverage and has particular application to public safety users in which groups may be formed dynamically and subscribers may be the members of more than one group. For example a fire tender which is a member of a fire service group may form a temporary group with say an ambulance and a police patrol vehicle to deal with a particular emergency incident. A group has a subscriber record and a home node (HN) in exactly the same way as an individual subscriber.

Membership of a group is recorded at all the relevant nodes along the snail trail. Additionally, the routing manager at the subscriber's registration node retains a list of identities (and the interfaces by which they are reached) of all those subscribers joined to a particular group. Membership of the group is also recorded in the individual's subscriber record, and all copies of the record along the snail trail to the individual's home node (HN) are similarly updated by means of a join notification (in the same way as a registration notification).

Figure 5:
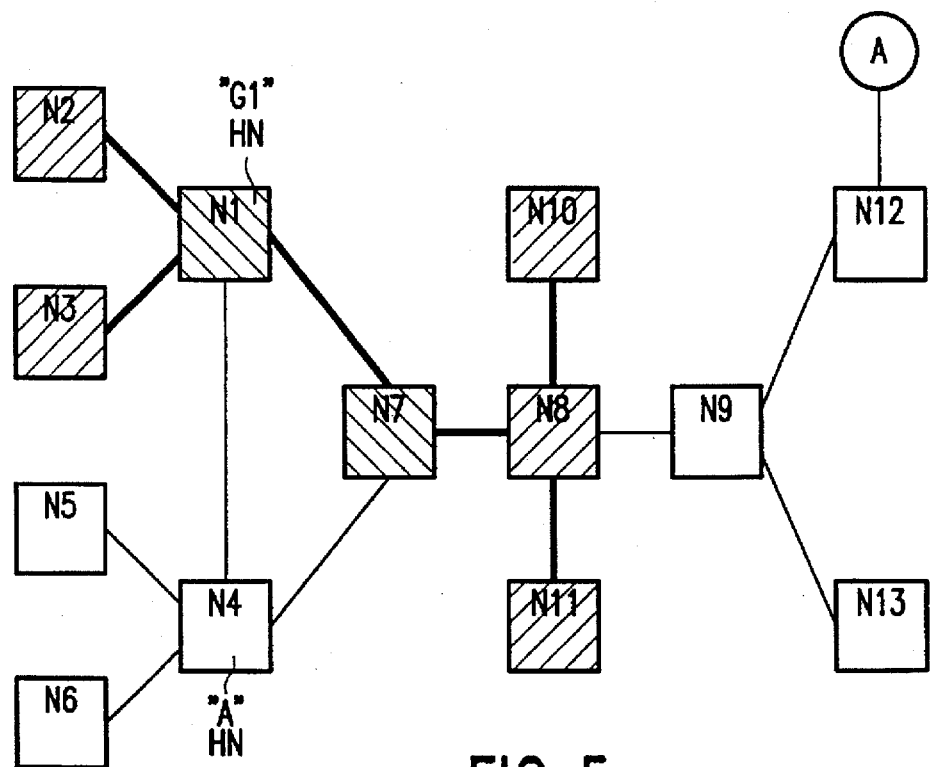
FIG. 5 is a diagram showing the coverage tree for a group registration.
Figure 6:
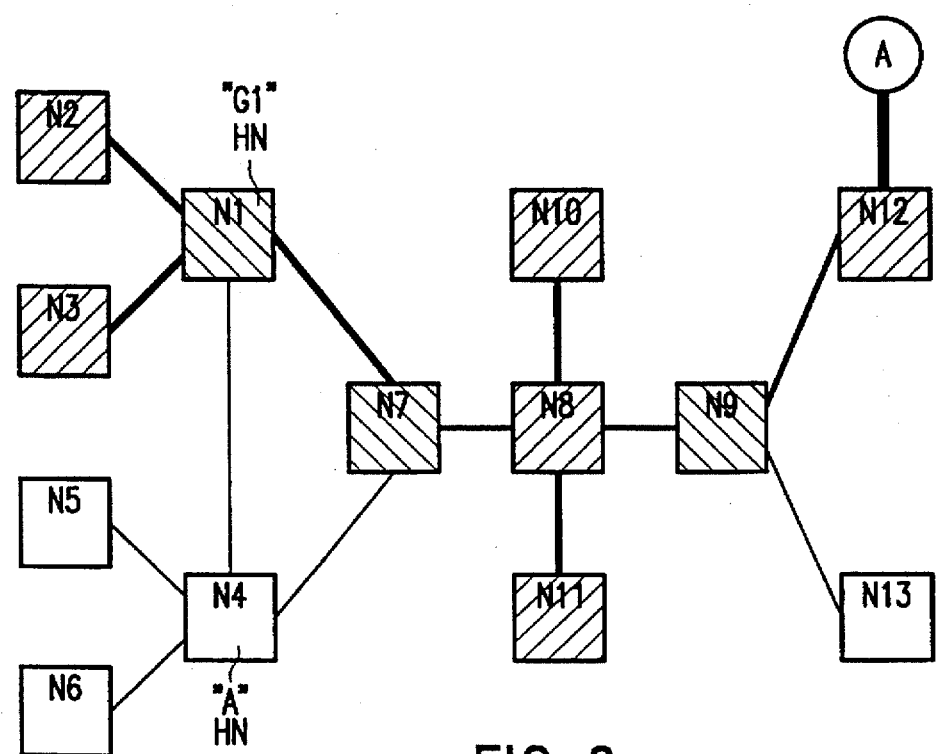
FIG. 6 illustrates the coverage tree for a group registration following another subscriber unit joining the group.

If the subscriber is the first member of a group G1 at that node, a copy of the group record will not exist at the node, so the subscriber's join request is translated into a join request on behalf of the node itself and propagated towards the group's home node "G1" HN, that is node N1 in FIGS. 5 and 6. The reply to this request (join acknowledgement Jn.Ack) forms another snail trail between the group's home node and the registration node. At each node on the trail, a copy of the group record is retained, indicating the address of the node at which the join request was made.

Referring to FIG. 6, as more subscribers join the group, multiple snail trails are established, forming what will be termed a "coverage tree" emanating from the group home node, node N1. A copy of the group record is held at every node on the coverage tree, containing the addresses of all the nodes at which subscribers have joined the group, these nodes being known as coverage nodes. Nodes on the coverage tree, including the group home node, may or may not themselves be a coverage node.

FIG. 5 shows the coverage tree before subscriber A joins the group and FIG. 6 shows the coverage tree after subscriber A has joined the group. Those nodes at which group registration has occurred, that is nodes N2, N3, N8, N10 and N11 in FIG. 5 and nodes N2, N3, N8, N10, N11 and N12 in FIG. 6, are shown in one type of crosshatching and other nodes on the snail trail holding a copy of the group record, that is nodes N1, N7 in FIG. 5 and N1, N7 and N9 in FIG. 6, are shown in another type of crosshatching.

Figure 7:
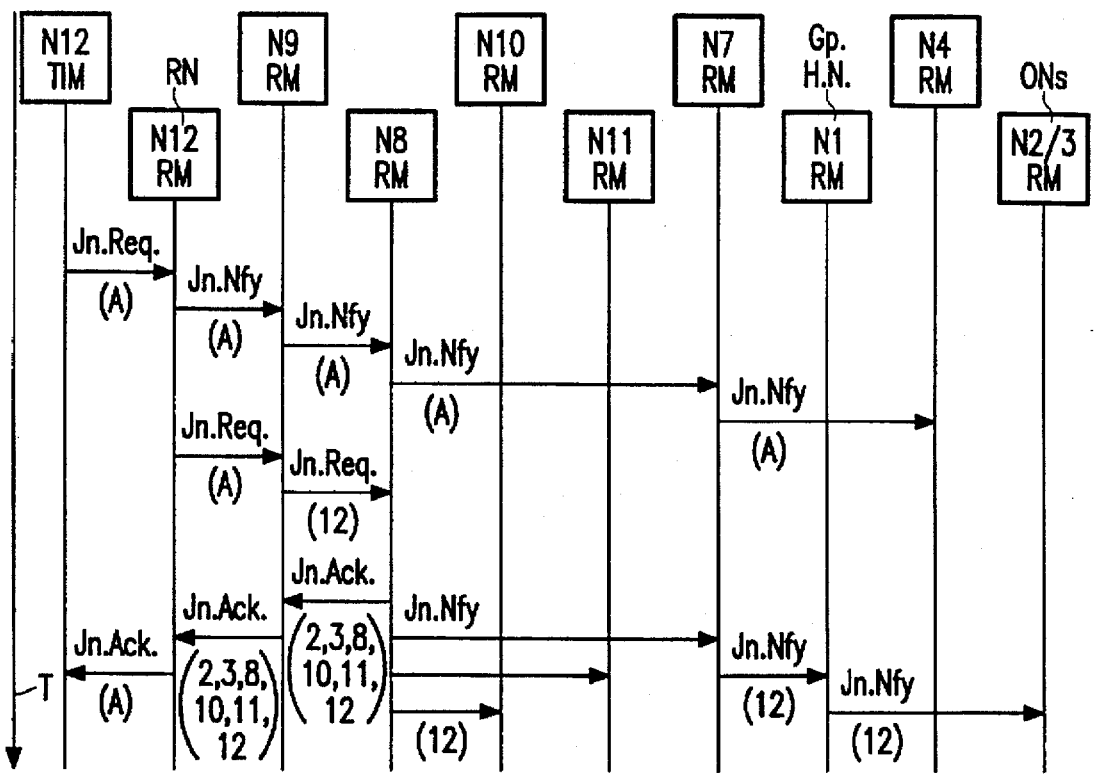
FIG. 7 shows the message sequence for joining a group.

FIG. 7 shows the sequence of messages involved when registering node N12 as a member of the group. Initially N12's terminal interface manager (TIM) generates a join request (Jn. Req.) which is relayed to N12's routing manager (RM), which in turn generates a join notify (Jn.Nfy) message which is passed to N9 and then successively to N8, N7 and N4. The RM of N12 then generates a Jn.Req. message which is relayed to the RM of N8 via the RM of N9. Since the node N8 holds details of the group, the join request message Jn.Req. is replied to by this node which replies with a join acknowledgement Jn.Ack. and also notifies Jn.Nfy. notifies all routing managers RM of the nodes to which it is connected, that is nodes N1, N2/3, N7, N10 and N11, that the node N12 is a group member. The Jn.Nfy. message is passed node by node to the home node, HN, and the other nodes ONs in the coverage tree.

In the event of a subscriber leaving a group, its leave request is forwarded to its individual home node, updating all the records on the snail trail. Additionally, the subscriber's identity is removed from the locally held list of group members. If at any one node, this list is now empty, the node itself forwards a leave request to the group home node. As a consequence the group coverage tree is modified.

In some systems, subscribers may be permanently joined to groups, that is dynamic joining and leaving is not permitted. In general, subscribers may change the node on which they are registered whilst still joined to one or more groups. In both cases, the necessary updating of group coverage can be implicitly triggered by the registration procedures.

At the new registration node, when the registration acknowledgement Reg.Ack. message with the subscriber's record is received it contains details of the individual's group membership. The node can thus add the individual's identity to the appropriate group lists, and if necessary create new lists and generate join requests (Jn.Req) on behalf of itself.

Similarly, at the old registration node (RN), receipt of the deregister message causes the individual's identity to be removed from lists. Any lists thus becoming empty are deleted and a leave notification (Lve. Nfy.) generated.

Figure 8:
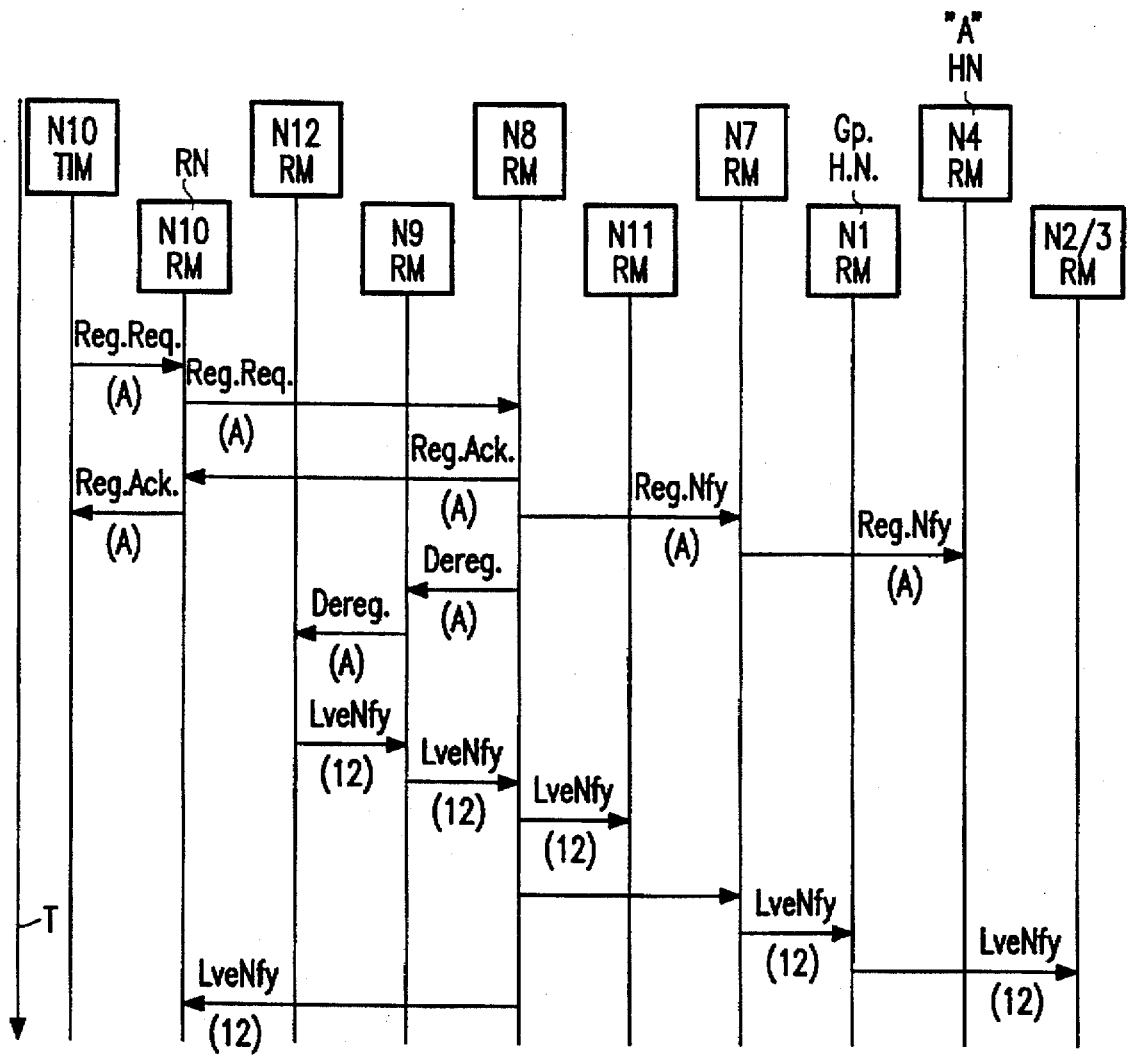
FIG. 8 shows the message sequence for implicitly updating group coverage on registration.

Hence membership lists and group coverage are implicitly updated. FIG. 8 shows the message sequence when subscriber A in FIG. 6 moves from node N12 to node N10. Node N10 is already in the group coverage, so no join request is generated. No group members are registered at node N12, so a leave notification is generated, and the coverage tree reverts to that of FIG. 5.

Radio subscribers (or in some cases operators of line connected despatcher equipment) may change the node on which they are registered whilst still joined to one or more groups. In such cases, implicit leave requests must be generated at the old registration node and join requests generated at the new registration node, so that the membership lists at both nodes, and hence the inclusion or otherwise of the nodes in the group coverage, may be kept up to date.

Some systems require individual subscribers to join or leave a group on demand from a despatcher. This may be done by an instruction to the subscriber terminal to which it responds with a join request. This in some respects is analogous to demand registration.

In some systems there may be a requirement for groups to have a fixed geographical coverage area, either as an alternative to or in addition to dynamic coverage. For example, it may be necessary to be able to switch dynamic coverage on or off in a group so that calls are either to the default coverage area or are "roamer include" according to operational requirements. This may be achieved by assigning for each group some nodes as default coverage nodes. At subscriber records in the coverage tree, these nodes would be marked as default, so that a call which is not to include roamers would be set up on these sites only. Furthermore, even if no subscribers are joined to the group at these nodes, they are not removed from the coverage tree—this allows operation with more basic subscriber equipment which may not support joining and leaving groups, for example the infrastructure does not need to know about membership of such groups.

The description up to now has described the establishment of snail trails for individual and group registrations. Call set-up procedures will now be described beginning with group call set-up procedure.

A group call is initiated by a request received at any node in the system, across any interface. There are two different strategies for setting up group calls, these are immediate set-up and coordinated set-up.

Figure 9:
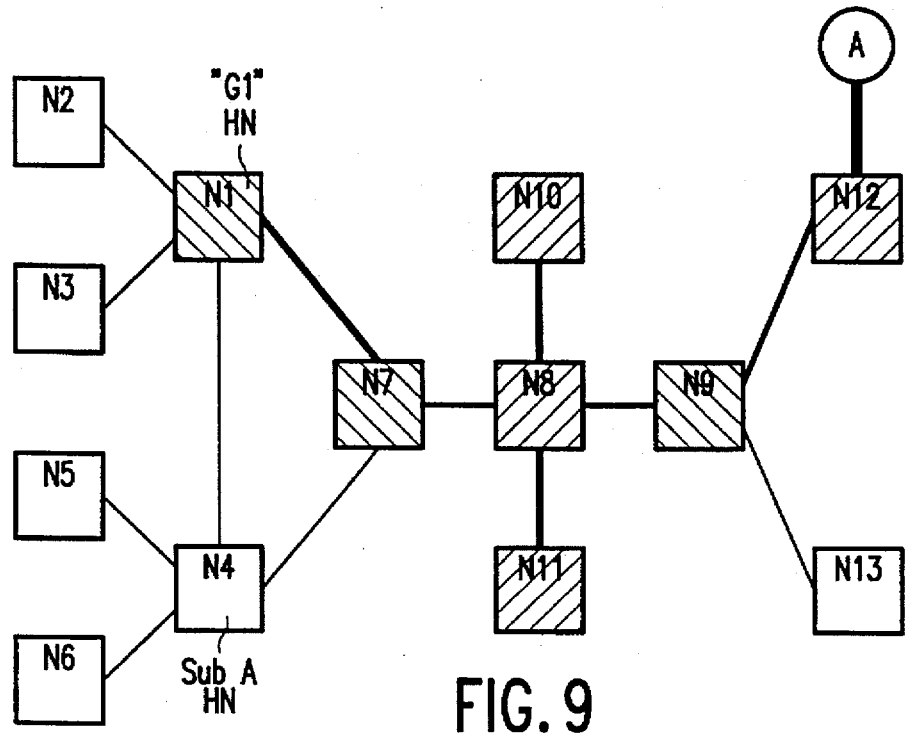
FIG. 9 is a diagram of group coverage used in call set-up examples.
Figure 10:
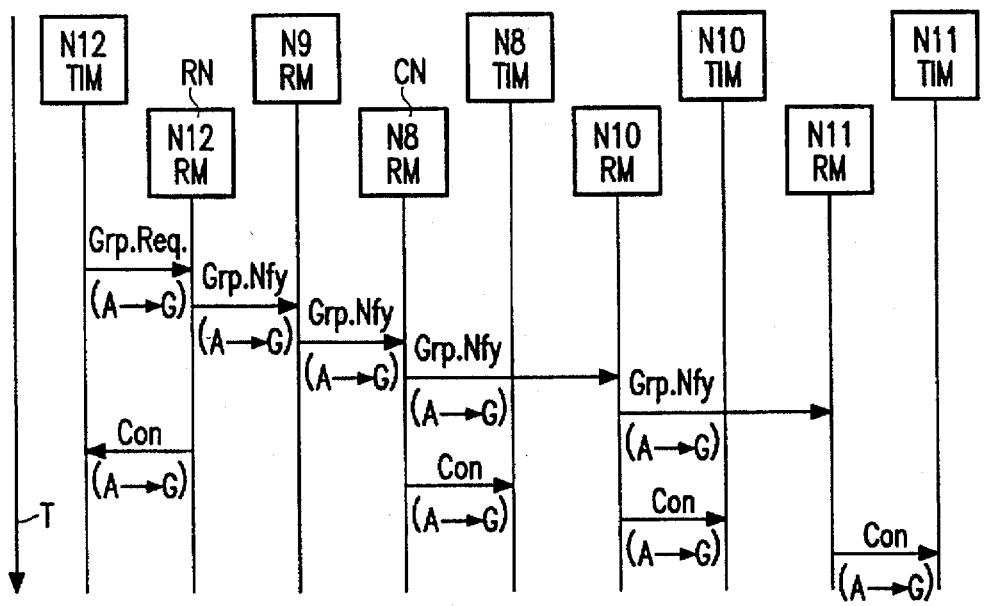
FIG. 10 shows the message sequence for immediate group call set up.
Figure 11:
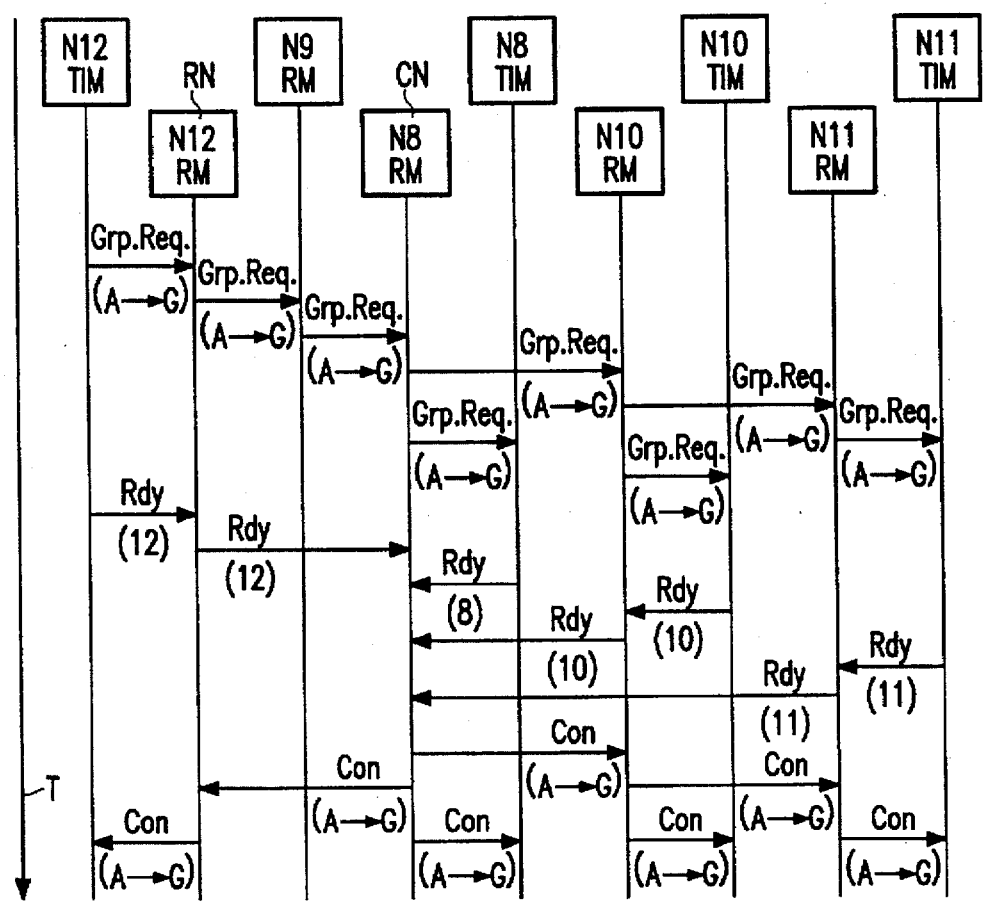
FIG. 11 shows the message sequence for co-ordinated group call set-up.

In the case of immediate set-up, when a group call request is received at a coverage node, the call is immediately set-up at that node (provided resources are available). The call is also propagated as a notification to all neighbouring nodes in the coverage tree. At each of these nodes, the call is immediately set up if possible and passed in similar fashion. This goes on until all nodes within the coverage tree have been notified of the call. This method ensures the fastest possible call set-up, but the set-up on the various nodes is not synchronised—some may have to wait for resources. FIG. 9 illustrates a group coverage tree and FIG. 10 shows the required message sequence for the group in FIG. 9. In FIG. 10 the following abbreviations have the assigned meanings:

Grp. Req.—Group call request
Grp. Nfy.—Group call notify
Con.—Connect
CN—Control node
RN—Registration node In the case of coordinated set-up, the request is propagated around the coverage nodes in the same way as above, but the call is not immediately set-up. Instead, each node indicates individually to the control node CN (see below) when it has resources for the call. The control node collects the responses and decides on a predetermined criteria (for example complete coverage) when the call should commence, at which time it propagates a connect instruction to all the coverage nodes. Thus synchronised call set-up is achieved, but at the cost of delayed initial call establishment, especially if some nodes are waiting for resources. FIG. 11 shows the required message sequence. Many of the abbreviations in FIG. 11 correspond to those used elsewhere, however Rdy means Ready and Con means Connect.

Systems may use either or both strategies, depending in operational requirements. If calls from outside the current coverage area are permitted, the call request is directed towards the home node of the group. As soon as it arrives at a coverage node, the call is started according to the strategy in use, and a connect instruction sent back to the calling node. Thus the call is not set up on the requesting node until it can be set up on at least one coverage node.

A group call requires one node, called a control node (CN), to take control of call to achieve the following:

1) Control the set-up of the call as described above if the coordinated call set-up strategy is being used.

2) In a message trunked or quasi transmission trunked system, arbitrate requests to transmit so that only one subscriber transmits at one time. Transmission requests are always granted at the coverage node on which they are made, but may be over-ruled by the control node in the event of a conflict.

3) Monitor the call for inactivity and duration timeouts.

4) Coordinate the cleardown of the call.

Control of the call is assumed by one of the nodes according to the following rules:

a) If there is no coverage node on the "trunk" of the coverage tree, control is assumed by the node at the top of the trunk, whether or not it is a coverage node. Thus in FIG. 9, node N8 would be the control node (CN) even if it were not a coverage node. It follows from this that if there is no trunk (as in FIG. 6), the home node (HN) will assume control.

b) If there is one or more coverage node on the "trunk" of the tree, control is assumed by the nearest coverage node. Thus in FIG. 9, if node N7 was a coverage node, it would assume control. It follows from this that if the home node is a coverage node (CN) it will always assume control.

From the node point of view, each node checks if any of the coverage nodes in its list can be reached in the same direction as the group's home node. If not the node must be the control node. This strategy means that control is established as close as possible to the coverage nodes. In the limit, if there is only one coverage node, it will always be the control node.

Group calls can be monitored and at the call processing level no distinction is made between membership of a group and monitoring of that group. A request to monitor a group is the same as joining that group. It is possible, if required, to give some subscribers restricted membership of groups by denying any request to transmit.

Figure 12:
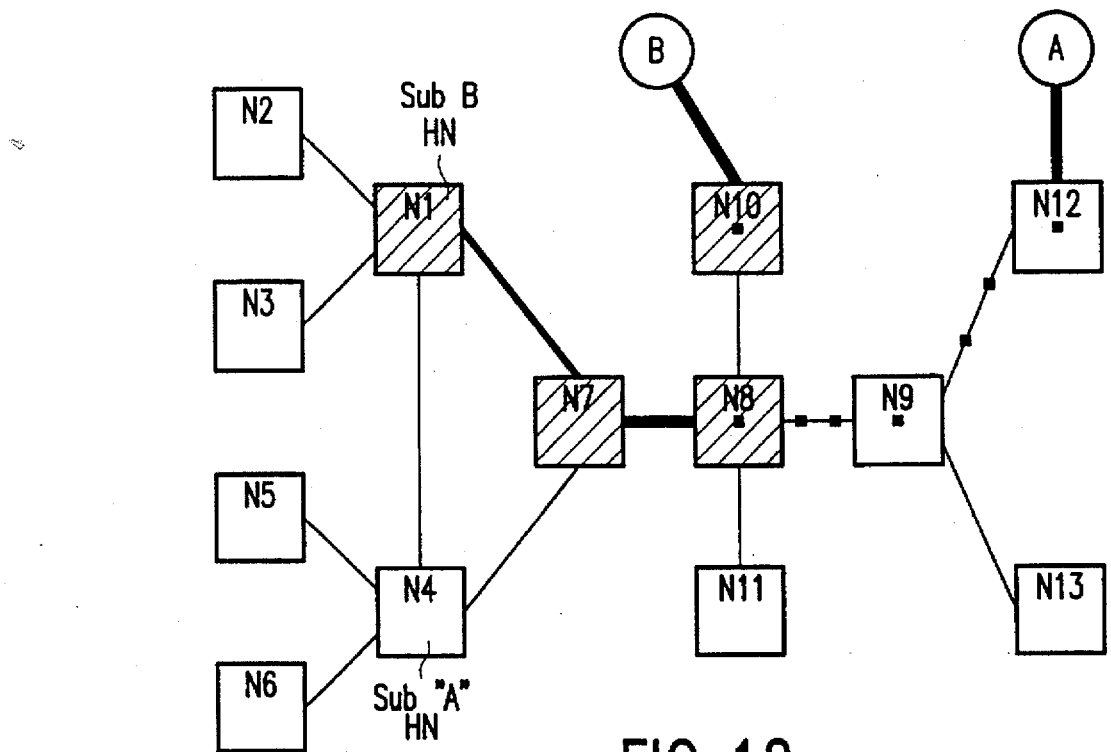
FIG. 12 is a diagram illustrating basic individual call set-up, subscriber A calling subscriber B.
Figure 13:
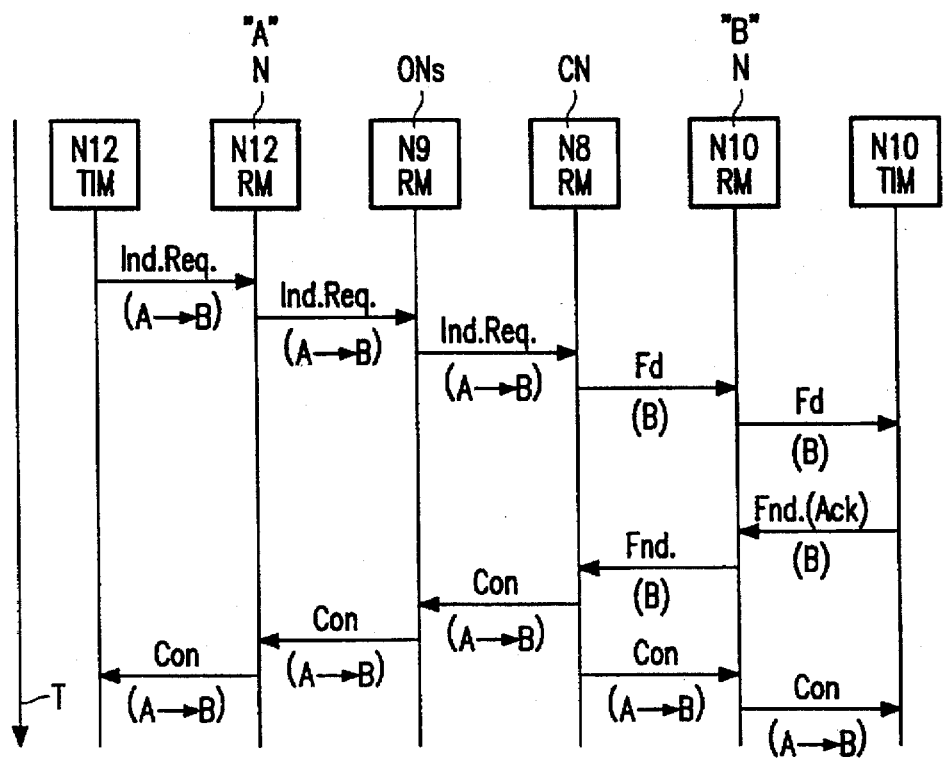
FIG. 13 shows the message sequence for basic individual call set-up.

The set-up for an individual call is fairly straightforward. A request received by a node across one of interfaces is directed towards the home node of the called party. As soon as it is received by a node on the snail trail of the called party, that node becomes the control node for the call (it may be the same node as that at which the request was received). It sends a find request up the snail trail to the registration node of the called party. This node checks the availability of the called party for the call and returns the response to the control node. If the response is positive, a connect instruction is directed to both calling and called party registration nodes. The control node then coordinates the call in the same way as for a group call, until the call is cleared. In FIG. 12 subscriber A on node N12 calls subscriber B on the node 10. The node N8 assumes control since it is the point at which the call request meets subscriber B's snail trail. FIG. 13 shows the message sequence. The various abbreviations have the following meanings:

Ind. Req.—individual call request

Fd—find, that is send an Ahoy request to a called party

Fnd—found, that is acknowledgement by the called party

Con—connect

The control node may optionally send individual call notification messages (not shown) to the home nodes of both subscriber A and subscriber B for the purposes of call logging or billing.

In some systems there may be a requirement to monitor the activity of individual subscribers and in order to do this an authorised subscriber (typically, but not necessarily, a despatcher) makes a request on any node to monitor any individual subscriber (referred to as the monitored party). The request behaves in much the same way as a request to join a group. The monitored party's identity is recorded in the monitoring party's record in much the same way as a group identity is recorded in an individual subscriber record on joining a group in that the update is propagated to the home node.

Figure 14:
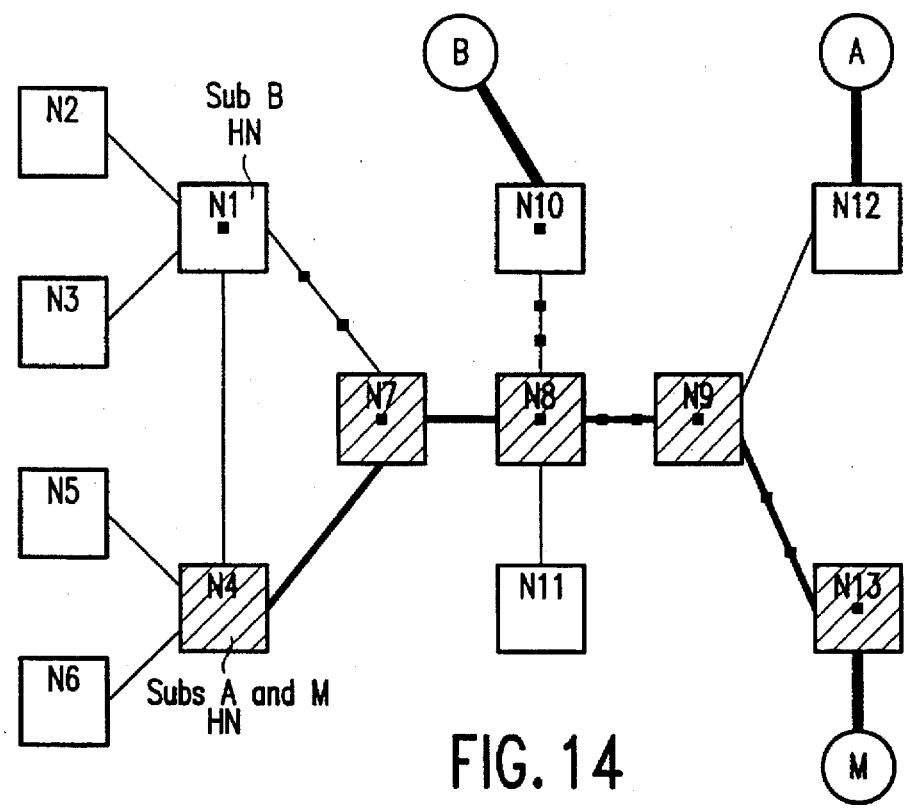
FIG. 14 is a diagram illustrating a request from subscriber M to monitor subscriber B.
Figure 15:
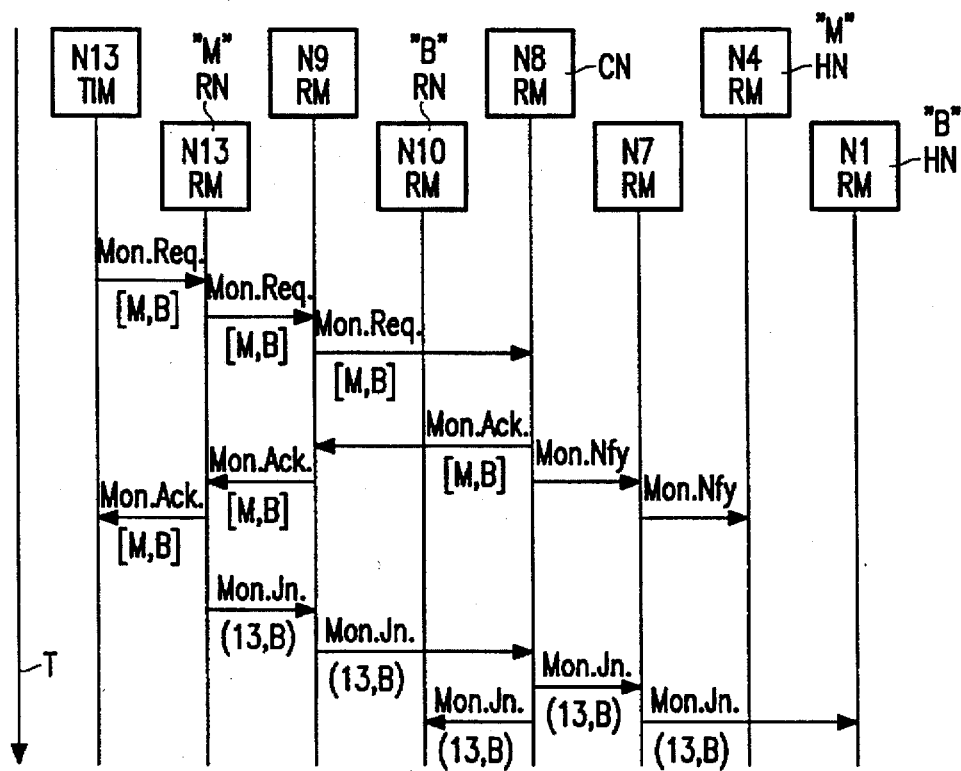
FIG. 15 shows the message sequence for setting up monitoring.

FIG. 14 shows a request from subscriber M to monitor subscriber B. The request is propagated to M's home node N4 as indicated by the emboldened lines interconnecting nodes N13, N9, N8, N7 and N4. The monitoring paths are indicated by the squares straddling paths between the nodes. If M subsequently roams, implicit requests to cancel monitoring on the node 13 and establish monitoring on the new registration node are generated. FIG. 15 shows the message sequence. If M is the first subscriber to request monitoring of B at node 13, the request, Mon. Req., is additionally directed on behalf of node 13 to B's home node N4. At node N8, it meets the snail trail for B. Here, the address of the monitoring node N13 is recorded in B's record and propagated along the whole length of the snail trail in both directions. Other abbreviations used in FIG. 15 are:

Mon. Nfy—Monitoring Notify

Mon. Ack.—Monitoring Acknowledged

Mon. Jn—Monitoring Join

There are in fact a number of different possible ways to implement monitoring. In this embodiment, the most flexible possible scenario is assumed, by which the number of monitoring subscribers at a given node is not restricted, and a subscriber may be monitored at multiple nodes. In practice it will probably be necessary to place restrictions on monitoring in order to limit inter-node traffic loading. The opposite extreme is to allow only a single monitoring party per subscriber, in which case the monitoring party's identity as well as their registration node may be recorded in the monitored party's record.

Figure 16:
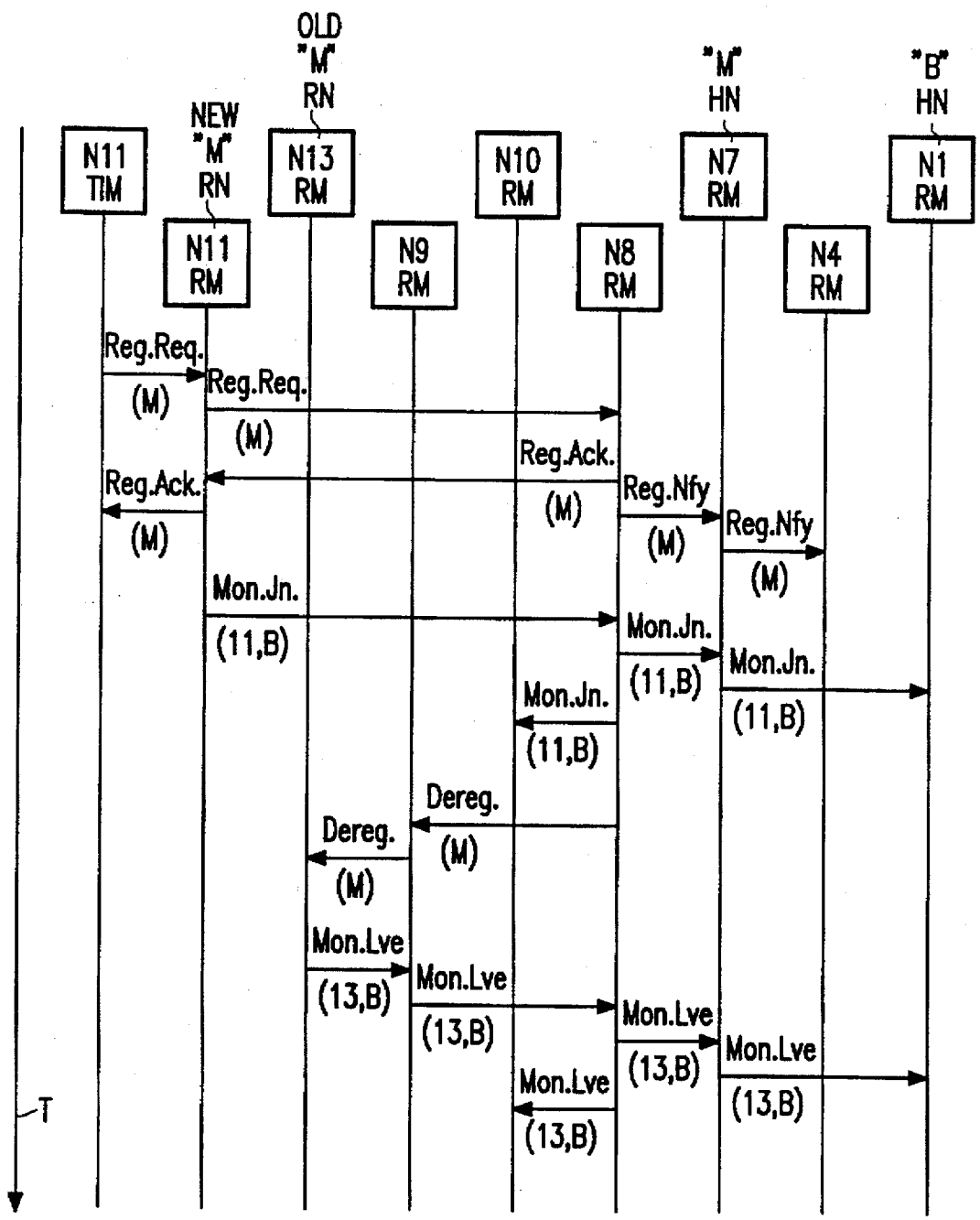
FIG. 16 shows the message sequence relating to registration with individual monitoring in progress.

Once set up in this way, monitoring can be maintained if either the monitoring party or the monitored party roams:

a) If M roams, the receipt of M's record at the new registration node (RN) triggers a request from that node to join the monitoring of B At the same time, the deletion of M's record at the old registration node triggers a request to B's home node to cease monitoring. This situation is shown in FIG. 16. Note that the join (Jn) and leave (Lve) sequences, which are separated for clarity, may in practice overlap, and the order of arrival at the monitor control node N8 cannot be predicted. If M's identity (as well as its registration node) is held in B's record, the leave message would not be required as it would be implied by the join, and b) If B roams, no special action is needed since the monitoring information is carried within B's subscriber record which is distributed along the new snail trail.

Figure 17:
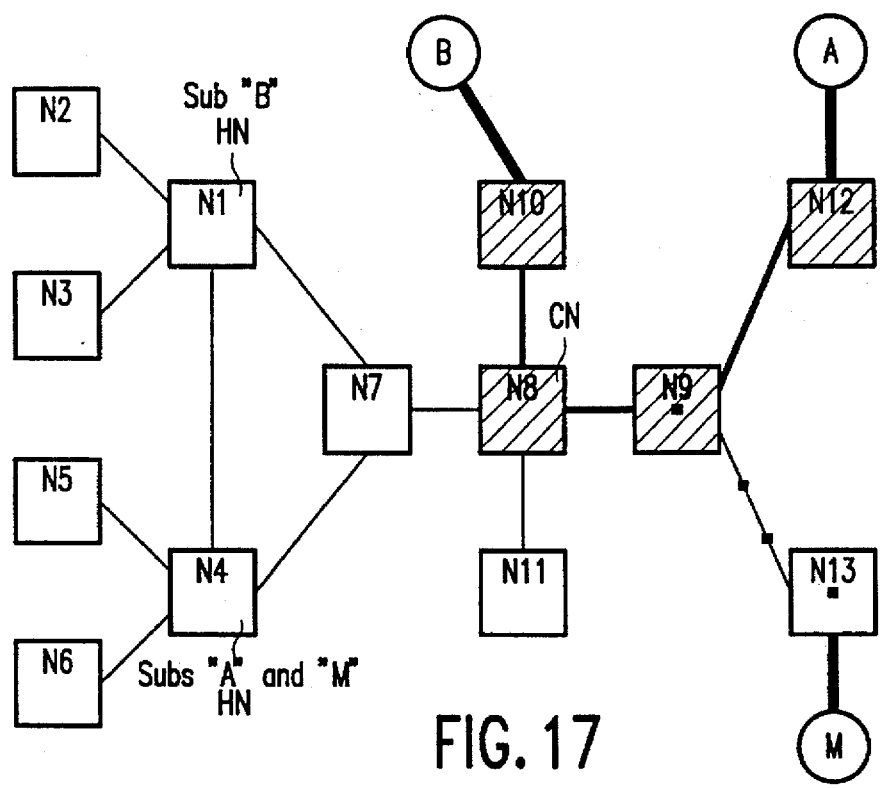
FIG. 17 is a diagram illustrating subscriber M monitoring subscriber B in a call from subscriber A.
Figure 18:
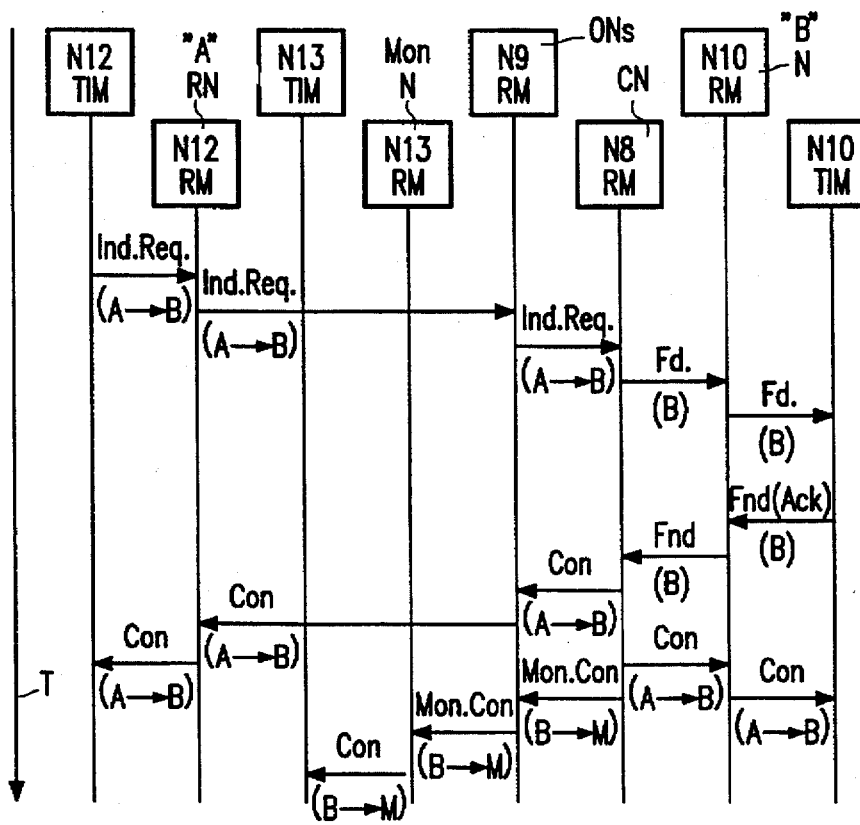
FIG. 18 shows the message sequence for individual call set-up with monitoring.

When an individual subscriber is monitored, any individual calls set up by the individual subscriber as the calling party or received as the called party are also directed to the monitoring party. This is achieved by the control node (CN) sending a monitor connect message to the monitoring party at the same time as the connect messages are sent to the parties in the call. FIG. 17 illustrates subscriber M monitoring subscriber B in a call from subscriber A, the monitoring path meets the call path before the control node N8. In FIG. 17 when the connect message reaches node 9, a monitor connect message is generated and sent to node 13. The message sequences relating to A setting up a call with B and establishing a monitoring path with the node N13 is shown in FIG. 18. The abbreviations Mon. Con. and Ind. Req. mean monitoring connected and individual request, respectively.

Figure 19:
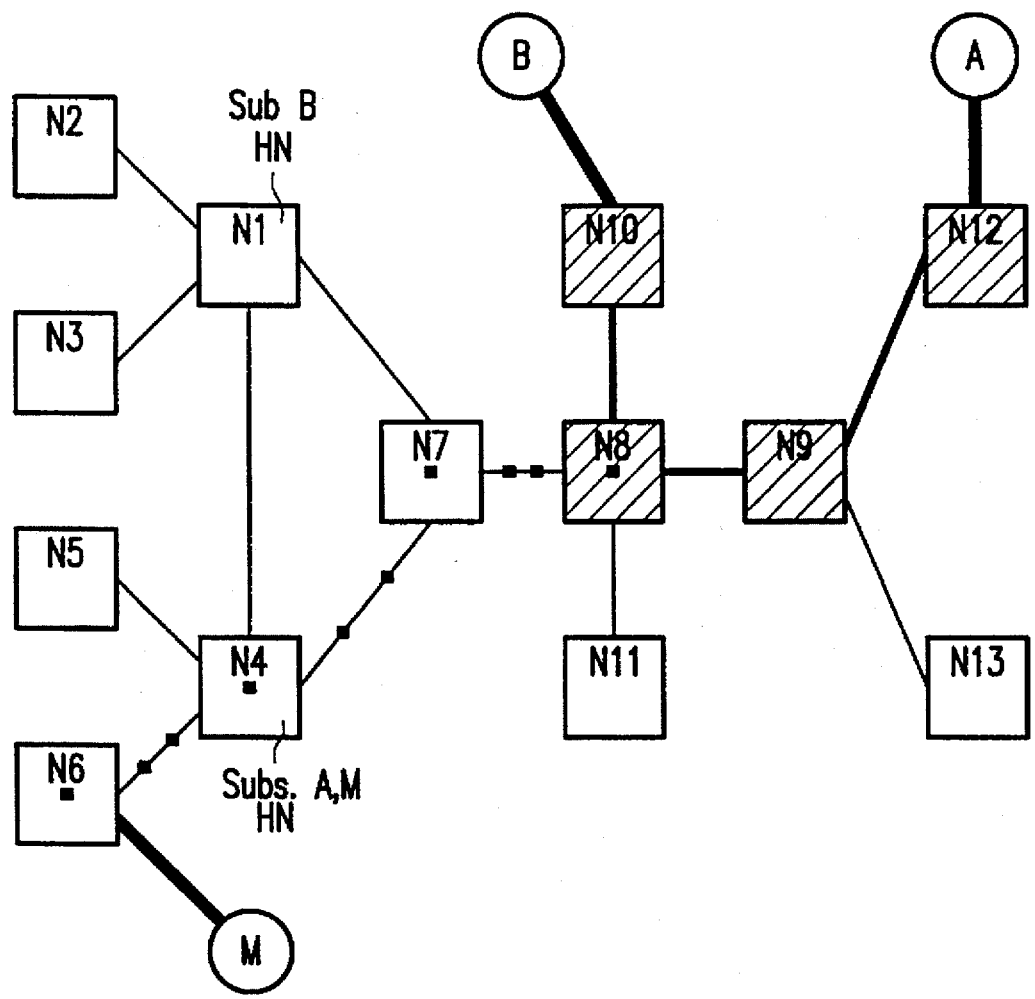
FIG. 19 is a diagram illustrating call set-up with a monitoring path extending beyond the control mode.

FIG. 19 shows a different situation in which M is registered on the network at a point beyond the control node. In this case, the monitor connect message is directed from the node N8 (according to the routing tables at each node) to the node N6.

The call processing and mobility management functions described are fairly complex in operation. An essential feature of communication systems is reliability and robustness in the event of failure. The system should be so designed that the impact of a single failure in either a node in the system or a link between nodes is limited.

Data links in a distributed system are always vulnerable to failure. As a first level of protection, it should be possible to build in secondary routing, if not for the whole system, then at least for those parts considered critical. For example, in the configuration illustrated in FIG. 1, if the link between node N1 and node N7 fails, an alternative route via node N4 is available. If lower level software looks after the switching between primary and secondary routes, the logical routing on which call processing and mobility management is based can still be maintained. Apart from a slight loss of performance, for example longer call set-up times, there is no impact on the system unless the links on the alternative route become overloaded. In a practical system far more secondary routes could be provided than in the system shown in FIG. 1.

As a precaution against failures in node equipment which is critical to the operation of the system, either because many data routes depend on them or because they are the home node for a significant number of users, such node equipment should be duplicated, so that total node failure is highly unlikely.

When equipment is duplicated, there is still a difficulty in maintaining operation when switching between a main and a standby equipment. It must be accepted that loss of calls in progress may occur, and that some kind of reset sequence will be required, as a result of which subscribers may have to re-register. This is still preferable to a total loss of service.

For many applications, duplication of links and equipment may be sufficient, and no further measures required. If a system element fails in spite of the protection, loss of service occurs, possibly severe, but the risk of this happening is considered acceptable. If a further level of robustness is required, this is implemented as a fallback mode of operation. The main problem when parts of the system are isolated is that subscribers may lost contact with their home node, or with the home node of a subscriber they are trying to contact.

The use of the snail trail makes it less likely that a subscriber who is isolated from its home node is effectively prevented from moving around the system, even though the failure may be remote, since many registration requests and incoming call requests do not reach the home node, but are acknowledged as soon as they intercept the snail trail. Only notifications fail to reach the home node (HN)—these can be stored up at the nearest operational node. For example, in FIG. 3, if node N4 has failed, the registration notification is stored up at node N7.

There are some cases, of course where a request is required to reach the home node. For example, in FIG. 3 if subscriber A attempts to register on node N2, the registration request would normally reach the home node N4 via node N1, without intercepting the snail trail. In such a case, either a loss of service is accepted, or the nearest node (that at which the loss of contact becomes apparent, node 1 in the example) must try to find a copy of the subscriber record by attempting to intercept the snail trail at other nodes. In the example, if the request is sent instead to node N7, the snail trail is indeed intercepted. In this case node N7 may assume the role of fallback home node for subscriber A and handle the request accordingly. In the example just described, the trail will follow nodes N2-N1-N7 rather than N2-N1-N4. The recovery mechanism must ensure that node N4 can regain control smoothly.

It may be possible to designate in advance a fallback home node for each normal home node, so that in the event of failure, messages are directed automatically to the fallback node.

From reading the present disclosure, other modifications will be apparent to persons skilled in the art. Such modifications may involve other features which are already known in the design, manufacture and use of communications systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application of or any further application derived therefrom.

I claim:

1. A communications system, comprising:
   a network formed by a plurality of geographically distributed interconnected nodes, each defining a service area;
   means interconnecting the nodes;
   a plurality of subscriber units;
   means for storing registration details of a subscriber unit at one of said nodes, defined as a home node; and
   means responsive to a subscriber unit registering with a node other than its home node for causing registration details relating to that subscriber unit to be stored at those of said interconnected nodes lying on a path between said home node and the node at said subscriber unit registered.

2. A system as claimed in claim 1, characterised in that in response to a subscriber unit registering with a node, any node or nodes carrying registration details of the subscriber unit but not lying on the path of interconnected nodes between the home node and said node with which said subscriber unit registered, deregisters the subscriber unit.

3. A system as claimed in claim 1 characterised in that when a subscriber unit wishes to set-up a call through a first node with another subscriber unit registered on a second node, said first node has means for initiating relaying of a call request node by node through the network and each intermediate node has means for checking if the registration record of the another subscriber unit is contained therein, and in response to determining that the registration record of the another subscriber unit is contained therein, said means for relaying of the intermediate node containing the registration record actuates means for initiating a call request along the path to the node at which the another subscriber unit is currently registered, and in receipt of an acknowledgment, connects the subscriber units together and notifies a home node of said another subscriber unit by way of intermediate nodes on the path.

4. A system as claimed in claim 1, characterised in that a node has means for processing a request from a first subscriber unit to monitor a call made by a second subscriber unit registered with another node, in that the node with the processing means has means for progressing said monitoring request node by node to a node on the path to said another node, in that each node of the path has means for recording the address of the node processing the monitoring request and for propagating said address to other nodes in the network.

5. A system as claimed in claim 1, characterised in that at least 2 subscriber units form a group having a group registration identity, in that at least one of said nodes comprises means, responsive to a subscriber unit belonging to a group registering with the at least one node, for checking if the group is already registered with the at least one of said nodes, and if the group is not registered, for registering the group registration with the the at least one of said nodes.

6. A system as claimed in claim 5, characterised in that said means for checking and registering is also responsive to a subscriber unit having a group registration identity being deregistered for checking if the at least one of said nodes has remaining registered therewith any other subscriber units having the same group registration identity as that of said subscriber unit being deregistered and if not, for deregistering the group.

7. A system as claimed in claim 5, characterised in that the at least one of said nodes has means for initiating a group call in response to a request received thereat.

8. A system as claimed in claim 7, characterised in that each said means for initiating a group call propagates the call to all the nodes forming a coverage tree of the group whereupon the call is set up on receipt.

9. A system as claimed in claim 7, characterised in that each said means for initiating a group call propagates a call request to all the nodes forming a coverage tree of the group and in that one of said nodes propagates a connect instruction to the other nodes forming the coverage tree.

10. The communication system as claimed in claim 1 wherein said registration details stored in those of said interconnected nodes lying on a path between said home node and the node at which said subscriber unit registered are sufficient to validate said subscriber unit for the initiation of a call without requiring any other information from the home node of said subscriber unit.

11. A communications system for use in serving a plurality of subscriber units, comprising:

a network formed by a plurality of geographically distributed nodes, each defining a service area;

means for storing registration details of a subscriber unit at one of said nodes, defined as a home node therefor; and means, responsive to said subscriber unit registering with a node other than said home node, for causing registration details relating to said subscriber unit to be stored at those of said interconnected nodes which lie on an interconnected path between said home node and the node at which said subscriber unit registered.

12. A particular node for use in a communications system for use in serving a subscriber unit, said communications system including a network formed by interconnecting a plurality of geographically distributed nodes, each of said nodes defining a service area, said particular node being one of said nodes, said subscriber unit being assigned to one of said nodes as a home node, said particular node comprising:

means for communicating with at least two others of said nodes, including means (i) for receiving from a first of said at least two other nodes registration details relating to said subscriber unit, and (ii) for transmitting said received registration details to a second of said at least two other nodes; and means for storing registration details relating to that subscriber unit when (a) said subscriber unit registers with a node other than its home node, (b) said particular node lies on a path of interconnected nodes between said home node and said node at which said subscriber just registered, and (c) said particular node is not said home node nor said node at which said subscriber just registered.

13. A particular node for use in a communications system for use in serving a subscriber unit, said communications system including a network formed by a plurality of geographically distributed interconnected nodes each of which defines a service area, said particular node being one of said nodes, said subscriber unit being assigned to one of said nodes as a home node, said particular node comprising:

means for receiving registration details relating to said subscriber unit when said particular node lies on a path of interconnected nodes between said home node and a node at which said subscriber unit most recently registered when said particular node is not said home node nor said node at which said subscriber unit most recently registered;

means for storing said received registration details substantially only while said particular node continuously remains part of a path of interconnected nodes between said home node and said node at which said subscriber unit most recently registered.

14. A particular node for use in a communications system for use in serving a subscriber unit, said communications system including a network formed by a plurality of geographically distributed interconnected nodes each of which defines a service area, said particular node being one of said nodes, each of said subscriber units being assigned to one of said nodes as a home node, said particular node comprising:

a transceiver; and means, responsive to a subscriber unit registering with a node other than its home node, for storing registration details relating to that subscriber unit substantially only while (i) said particular node lies on a path of interconnected nodes between said home node and a node at which said subscriber unit most recently registered and (ii) said particular node is not said home node nor said node at which said subscriber unit most recently registered.

15. A communications system, comprising:

a network formed by a plurality of geographically distributed nodes, each defining a service area;

a plurality of subscriber units;

means for storing registration details of a particular subscriber unit at one of said nodes, defined as a home node for said particular subscriber unit; and means, responsive to said particular subscriber unit registering with a particular node which is other than its home node, for causing registration details relating to said particular subscriber unit to be stored at those of said nodes lying on an interconnected path between said home node and the particular node at which said registration occurred.

16. A system as claimed in claim 15, characterised in that in response to said particular subscriber unit registering with said particular node, any node or nodes carrying registration details of said particular subscriber unit but not lying on the path of interconnected nodes between the home node and said particular node, deregisters said particular subscriber unit.

17. A system as claimed in claim 15 wherein each node along a connected path between said particular subscriber unit and another subscriber unit of said plurality of subscriber units registered at one of said nodes comprises:

means for receiving a request for a call between said particular subscriber unit and said other subscriber unit;

means responsive to receipt of said call request for making a determination as to whether or not the node that received the call request carries the registration record of said other subscriber unit; and means for initiating a call request along the path to the node at which said other subscriber unit is currently registered, said initiating being in response to a determination that it has the registration record of said other subscriber unit.

18. A node for use in a communications system formed by a plurality of geographically distributed nodes, each defining a service area, said node comprising:

- means for interconnecting said node to at least one other node;
- means adapted for coupling said node to at least one subscriber unit;
- means for storing registration details of a particular subscriber unit for which said node is defined as a home node; and
- means, responsive to another of said subscriber units registering with any node of said communication system that is not a home node for said other subscriber unit, for initiating the storage of registration details relating to said another subscriber unit in at least one of said nodes lying on a path between said home node and the node at which said another subscriber unit registered.

19. The invention as defined in claim 18 wherein said path is a non-hierarchical path.

20. The invention as defined in claim 18 wherein said registration details are sufficient to validate a subscriber unit for the initiation of a call without requiring any other information from the home node of said subscriber unit.

* * * * *